E. T. THAYER, Jr.
GAS CUT-OFF.
APPLICATION FILED MAR. 17, 1913.
1,080,389.
Patented Dec. 2, 1913.
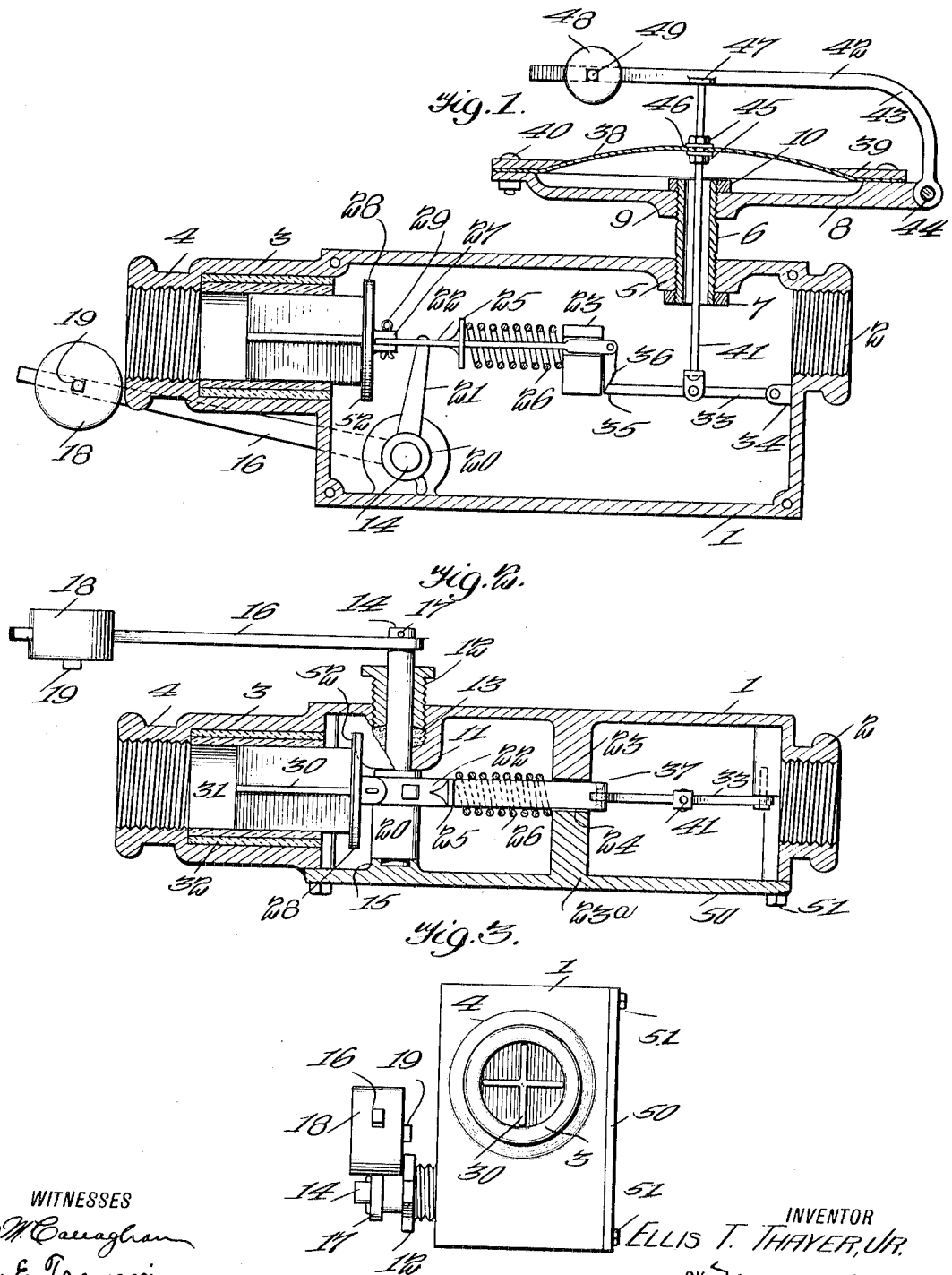
WITNESSES
INVENTOR
Ellis T. Thayer, Jr.
BY Munn & Co.
ATTORNEYS

UNITED STATES PATENT OFFICE.

ELLIS TODD THAYER, JR., OF CHARLESTON, WEST VIRGINIA.

GAS CUT-OFF.

1,080,389.   Specification of Letters Patent.   Patented Dec. 2, 1913.

Application filed March 17, 1913. Serial No. 754,736.

*To all whom it may concern:*

Be it known that I, ELLIS T. THAYER, Jr., a citizen of the United States, and a resident of Charleston, in the county of Kanawha and State of West Virginia, have invented a new and useful Improvement in Gas Cut-Offs, of which the following is a specification.

My invention is an improvement in gas cut-offs, and has for its object to provide a cut-off of the character specified, which will automatically close when the pressure falls below a predetermined point, and which will be held closed by the pressure until it is again opened.

In the drawings: Figure 1 is a vertical section of the improved cut-off, Fig. 2 is a section at right angles to Fig. 1, and Fig. 3 is an end view.

The present embodiment of the invention comprises a casing 1 of rectangular cross section having at one end a threaded nipple 2, near the upper face of the casing and having at the other a tubular extension 3, provided at its outer end with an internally threaded nipple 4, the said nipple being in alinement with the nipple 2. The casing is also provided with an internally threaded boss 5, in its upper face, near the nipple 2, and a short section of pipe 6, is threaded through the boss and is engaged by a lock ring or nut 7, at the inner face of the boss to prevent disengagement of the pipe section.

A shallow cupped disk 8 is provided with a central internally threaded boss 9, for engaging the upper end of the pipe, and a lock ring 10, similar to the ring 7, is engaged with the pipe above the disk. The pipe thus forms a communication between the casing and the upper face of the disk.

One of the side faces of the casing 1 is provided with a depression or recess forming a bearing and a packing receptacle 11, and a packing nut 12 is threaded into the recess, a packing 13 being arranged between the bottom of the recess and the inner end of the nut.

A shaft 14 is journaled in the bearing recess and packing nut, and in a stepped bearing 15 at the opposite side of the casing 1, and an arm 16 is connected with the outer end of the shaft, being held thereon by means of a pin 17.

A weight 18 is slidable on the arm 16, and a set screw 19 is threaded through the weight and engages the arm to hold the weight in adjusted position. The end of the shaft is reduced to engage the bearing 15 and between the bearing recess 11 and the said bearing, the shaft is polygonal in cross section, and an arm 21 is provided with a hub 20, fitting upon the said polygonal portion. The arm 21 extends at approximately a right angle to the arm 16 and engages an opening in a link 22.

Each face of the casing is provided with an inwardly extending lug 23 and 23$^a$ respectively, and the meeting ends of the said lugs are recessed to form a transverse opening 24 through which the link 22 extends. The link is provided with a cross head 25, adjacent to the opening for the arm 21, and a coil spring 26 is arranged between the cross head and the bar 23.

The end of the link 22 adjacent to the arm 21 is received between spaced lugs 27 on the inner face of a disk valve 28 and the lugs are connected to the ends of the link by means of a cotter pin 29. The disk valve 28 coöperates with the inner end of the tubular extension 3, and a guide vane 30 of X-shape is connected with the outer face of the valve, and moves in the extension 3. The said extension is provided with two concentric bushings 31 and 32, the former of glass and the latter of cement or the like, between the guide vane and the inner surface of the extension. The valve 28 closes against the end of the glass bushing. A lever 33 is pivoted at one end to a lug 34 at the end of the casing adjacent to the nipple 2, and the opposite end of the lever is beveled as shown at 35, and bears against the beveled end of an arm 36 pivoted to the adjacent end of the link 22. The said link end is slotted as shown, and connected to the arm by a pivot pin 37.

A flexible diaphragm 38 has its ends arranged on the edge of the cupped disk 8, and a holding ring 39 is bolted to the said edge by bolts and nuts 40, to hold the diaphragm to the disk. A stem 41 has its lower end pivoted to the lever 33 intermediate the ends thereof and the said stem extends through the pipe 6, through an opening in the diaphragm and above the diaphragm to engage the horizontal portion 42 of an arm comprising the said horizontal portion and a curved portion 43, whose outer end is pivoted to the cupped disk as shown at 44.

At the point where the stem passes through the diaphragm 38, holding nuts 45 are threaded on to the stem at opposite sides of the diaphragm and washers 46 are arranged between the nuts and the faces of the diaphragm to make a fluid tight connection. The lower face of the arm 42 is provided with a head 47, and the said head engages the upper end of the valve stem 41. A weight 48 is slidable on the portion 42 of the said arm and the said weight is held in adjusted position by a set screw 49.

In use, the casing is interposed in the pipe through which the gas flows, the nipple 4 being connected with one end of the pipe and the nipple 2 with the other in such manner that the gas must flow through the casing 1. It will be noticed that one side of the casing 1 is provided with a removable cover plate 50, the said cover plate being secured to the casing by means of screw bolts 51 or the like to permit the removal of the said cover plate when it is desired to obtain access to the interior of the casing. The gas enters through the nipple 2, passes through the casing 1, the tubular extension 3 and from the casing through the nipple 4. The spring 26 acts normally to close the valve. When the parts are in the position of Fig. 1, the arm 36 which is freely movable on the end of the link, takes a position at right angles to the link, and the beveled end of the lever by its engagement with the beveled end of the arm holds the link against the pressure of the spring and against the pressure of the weight 18 in open position. To open the valve the arm 16 is lifted to cause the arm 21 to move the link inwardly until the arm 36 falls into the position of Fig. 1. The lever 42—43 is then lifted, and the in-flowing gas holds the said lever lifted by its pressure on the diaphragm and so holds the lever 33 in engagement with the arm 36. As long as the gas flows the parts will remain in this position. When the pressure in the casing is relaxed, the diaphragm will move downward to cause the lever 33 to release the arm 36, and the weight and the spring will close the valve. By means of the weights 18 and 48, the device may be arranged to cut off whenever the pressure falls below a predetermined point. That face of the valve 28 adjacent to the bushing is provided with a gasket 52, which bears against the end of the glass bushing. It will be noted that the ends of the pin 37 are flush with the side edges of the link 22, in order that the link may slide through the opening formed by the recesses in the inner ends of the lugs 23—23ª. By arranging the opening in the recess of the lug 23—23ª, the link is easily disengaged.

I claim:—

1. A device of the character specified, comprising a casing adapted to be interposed in a gas supply pipe and having openings at its opposite ends for receiving the ends of the pipe, said casing having a valve seat at one of the openings and a valve seating against the said seat, a link connected at one end to the valve, said casing having an inwardly extending lug provided with an opening through which the link extends, a spring normally pressing the valve toward its seat, a catch pivoted to the inner end of the link and adapted to take a position at right angles to the link and in engagement with the lug to hold the valve open when the said valve has been opened, a lever pivoted to the opposite end of the casing from the valve and engaging the arm to prevent the said arm moving into alinement with the link, a diaphragm acted upon by the pressure within the casing, a stem connecting the diaphragm with the lever, said diaphragm holding the lever in position to lock the arm when the pressure in the casing exceeds a predetermined point, and means outside the casing for opening the valve against the resistance of the spring.

2. A device of the character specified, comprising a casing adapted to be interposed in a gas pipe and having a valve seat and a valve coöperating with the seat for controlling the passage of the gas through the casing, a shaft journaled in the casing and having an arm engaging the valve, said shaft having an arm outside the casing for oscillating the shaft for opening and closing the valve, said last named arm extending approximately horizontal, a weight adjustable on the arm to move the valve into closed position, a catch for holding the valve open and means controlled by the pressure in the casing for releasing the catch to permit the weight to close the valve when the pressure falls below a pre-determined point.

3. A device of the character specified, comprising a casing adapted to be interposed in a gas pipe and having a valve for controlling the flow of the gas through the casing, an arm outside the casing connected with the valve for opening and closing the said valve, means in connection with the arm and adjustable with respect thereto for moving the said arm to close the valve, releasable means for holding the valve open, and means controlled by the pressure in the casing for releasing the said means when the pressure falls below a pre-determined point.

ELLIS TODD THAYER, JR.

Witnesses:
WILLIAM T. HAMILTON,
HERBERT A. YATES.